US011622267B2

(12) United States Patent
Flanagan

(10) Patent No.: US 11,622,267 B2
(45) Date of Patent: Apr. 4, 2023

(54) CONDUCTING SECURE TRANSACTIONS BY DETECTING CREDENTIAL MESSAGE WITH AUDIO BETWEEN FIRST APPLIANCE AND SECOND APPLIANCE

(71) Applicant: Visa International Service Association, San Francisco, CA (US)

(72) Inventor: Patrick Ryan Flanagan, Pleasanton, CA (US)

(73) Assignee: Visa International Service Association, San Francisco, CA (US)

(*) Notice: Subject to any disclaimer, the term of this patent is extended or adjusted under 35 U.S.C. 154(b) by 501 days.

(21) Appl. No.: 16/741,997

(22) Filed: Jan. 14, 2020

(65) Prior Publication Data

US 2020/0236547 A1 Jul. 23, 2020

Related U.S. Application Data

(60) Provisional application No. 62/793,537, filed on Jan. 17, 2019.

(51) Int. Cl.
*G10L 15/22* (2006.01)
*G06Q 20/30* (2012.01)
(Continued)

(52) U.S. Cl.
CPC ........ *H04W 12/06* (2013.01); *G06Q 20/3821* (2013.01); *G10L 15/1822* (2013.01);
(Continued)

(58) Field of Classification Search
CPC ......... G10L 15/18; G10L 15/22; G10L 15/28; G10L 17/00; G06F 21/30; G06F 21/44;
(Continued)

(56) References Cited

U.S. PATENT DOCUMENTS 6,581,035 B1 * 6/2003 Madan .................... G10L 15/26
704/273
6,957,185 B1 * 10/2005 Labaton .............. H04L 63/0838
704/500
(Continued)

FOREIGN PATENT DOCUMENTS

WO WO 01/45054 * 6/2001 ............... G07F 7/00

*Primary Examiner* — Martin Lerner
(74) *Attorney, Agent, or Firm* — The Webb Law Firm

(57) ABSTRACT

Provided is a system, method, and computer program product for conducting secure transactions with at least two appliances. The method includes monitoring audio data with a first appliance including a processor, a speaker, and a microphone; detecting, with the first appliance, an audible request to initiate a transaction from a user from the audio data; communicating, with the first appliance, a transaction request to at least one remote server in response to detecting the audible request to initiate the transaction; detecting, with the first appliance, a credential message received by the first appliance directly from a second appliance via an audio transmission, the credential message corresponding to the transaction request and including a limited use key provided to the second appliance from the at least one remote server or another remote server; and in response to detecting the credential message, initiating, with the first appliance, the transaction based on the limited use key.

17 Claims, 4 Drawing Sheets

(51) Int. Cl.
*H04W 12/06* (2021.01)
*G06Q 20/38* (2012.01)
*G10L 15/18* (2013.01)
*G10L 15/30* (2013.01)
*H04W 12/04* (2021.01)
*H04M 1/725* (2021.01)

(52) U.S. Cl.
CPC .............. *G10L 15/22* (2013.01); *G10L 15/30* (2013.01); *H04W 12/04* (2013.01); *G10L 2015/223* (2013.01); *H04M 1/725* (2013.01)

(58) Field of Classification Search
CPC ........ G06Q 20/08; G06Q 20/16; G06Q 20/30; G06Q 20/36; H04L 63/083; H04L 63/0838; H04L 63/0853; H04W 12/06; H04W 12/068
USPC ....... 704/257, 270, 270.1, 273, 275; 705/18, 705/67, 65, 71, 75; 726/4, 5
See application file for complete search history.

(56) References Cited

U.S. PATENT DOCUMENTS

| | | | |
|---|---|---|---|
| 8,699,944 B2* | 4/2014 | Malamud | H04L 63/0869 704/270.1 |
| 9,082,413 B2* | 7/2015 | Herring | G10L 25/51 |
| 9,805,733 B2* | 10/2017 | Park | G10L 15/22 |
| 10,321,310 B1* | 6/2019 | Scheer | H04L 63/08 |
| 10,554,657 B1* | 2/2020 | Siddiqui | G10L 15/22 |
| 2005/0010417 A1* | 1/2005 | Holmes | H04M 1/6066 704/275 |
| 2009/0204410 A1* | 8/2009 | Mozer | G10L 15/30 704/275 |
| 2014/0074637 A1 | 3/2014 | Hammad | |
| 2014/0101043 A1 | 4/2014 | Cincera | |
| 2015/0089607 A1* | 3/2015 | Hubner | H04L 63/0838 726/6 |
| 2015/0186892 A1* | 7/2015 | Zhang | G06Q 20/326 705/44 |
| 2015/0278820 A1* | 10/2015 | Meadows | G10L 25/48 705/64 |
| 2016/0292797 A1* | 10/2016 | Tucker | G06Q 30/0635 |
| 2017/0330215 A1* | 11/2017 | Bruno | G06Q 30/0239 |
| 2018/0137263 A1* | 5/2018 | Kurian | G06F 21/32 |
| 2018/0268402 A1 | 9/2018 | Agrawal et al. | |
| 2019/0386984 A1* | 12/2019 | Thakkar | H04L 63/18 |
| 2020/0005279 A1 | 1/2020 | Raquepaw | G06Q 20/3821 |
| 2020/0005364 A1* | 1/2020 | Aznaurashvili | G10L 15/26 |
| 2020/0097965 A1* | 3/2020 | Castoro | G10L 15/22 |
| 2020/0244452 A1* | 7/2020 | Lacava | H04L 63/0861 |

* cited by examiner

CONDUCTING SECURE TRANSACTIONS BY DETECTING CREDENTIAL MESSAGE WITH AUDIO BETWEEN FIRST APPLIANCE AND SECOND APPLIANCE

CROSS-REFERENCE TO RELATED APPLICATION

This application claims priority to U.S. Provisional Patent Application No. 62/793,537, filed Jan. 17, 2019, the disclosure of which is hereby incorporated by reference in its entirety.

BACKGROUND

1. Field

This disclosure relates generally to transaction systems and, in non-limiting embodiments, to a system, method, and computer program product for conducting secure transactions with audio between two appliances.

2. Technical Considerations

To conduct a transaction using a network-connected computing device, such as an appliance or mobile device, users often rely on payment credentials provisioned to such devices. For example, a user wishing to conduct a purchase using a voice-command home assistant platform operating on a network-connected speaker may need to use an account already on file with the home assistant platform. If the user wishes to use an account that is provisioned on his or her mobile device, and not provide that account identifier to the home assistant platform or merchant, the transaction may not be possible. There is no existing system or method for utilizing a payment credential provisioned on one device to conduct a transaction with another device. This can be especially problematic in the example of home assistant platforms in which a user makes audible requests to conduct transactions and may not want to speak each numeral of a credit card number for convenience or security reasons.

Accordingly, there is a need for a technically improved system and method for conducting a secure transaction with two appliances that overcome at least some of these problems.

SUMMARY

According to non-limiting embodiments or aspects, provided is a computer-implemented method for conducting secure transactions with at least two appliances, comprising: monitoring audio data with a first appliance including a processor, a speaker, and a microphone; detecting, with the first appliance, an audible request to initiate a transaction from a user from the audio data; communicating, with the first appliance, a transaction request to at least one remote server in response to detecting the audible request to initiate the transaction; detecting, with the first appliance, a credential message received by the first appliance directly from a second appliance via an audio transmission, the credential message corresponding to the transaction request and comprising a limited use key provided to the second appliance from the at least one remote server or another remote server; and in response to detecting the credential message, initiating, with the first appliance, the transaction based on the limited use key.

In non-limiting embodiments or aspects, the method further comprises detecting a presence of the second appliance with the first appliance. In non-limiting embodiments or aspects, the first appliance detects the presence of the second appliance based on radio frequency. In non-limiting embodiments or aspects, the method further comprises: receiving, with the second appliance, the limited use key from the at least one remote server; and generating, with the second appliance, the credential message based on the limited use key. In non-limiting embodiments or aspects, the credential message is communicated from the second appliance to the first appliance by generating an audible output that is received by the microphone of the first appliance. In non-limiting embodiments or aspects, the first appliance comprises a media system including natural language processing functionality, and the second appliance comprises a mobile phone.

According to non-limiting embodiments or aspects, provided is a computer program product for conducting secure transactions with at least two appliances, comprising at least one non-transitory computer-readable medium including program instructions that, when executed by at least one processor of a first appliance including a processor, a speaker, and a microphone, cause the at least one processor to: monitor audio data; detect an audible request to initiate a transaction from a user included in the audio data; communicate a transaction request to at least one remote server in response to detecting the audible request to initiate the transaction; detect a credential message received directly from a second appliance via audio transmission, the credential message corresponding to the transaction request and comprising a limited use key; and in response to detecting the credential message, initiate the transaction based on the limited use key. In non-limiting embodiments or aspects, the program instructions further cause the at least one processor to detect a presence of the second appliance with the first appliance.

In non-limiting embodiments or aspects, the first appliance detects the presence of the second appliance based on radio frequency. In non-limiting embodiments or aspects, the credential message is communicated from the second appliance to the first appliance by generating an audible output that is received by the microphone of the first appliance. In non-limiting embodiments or aspects, the first appliance comprises a media system including natural language processing functionality, and the second appliance comprises a mobile phone.

According to non-limiting embodiments or aspects, provided is a system for conducting secure transactions, comprising: (a) a first appliance comprising a speaker, a microphone, a network adapter, and a processor in communication with the speaker, the microphone, and the network adapter, the processor programmed or configured to: (i) monitor audio data with the microphone; (ii) detect an audible request to initiate a transaction from a user included in the audio data; (iii) communicate a transaction request to at least one remote server in response to detecting the audible request; (iv) detect a credential message received directly from a second appliance via audio and/or radio transmission, the credential message corresponding to the transaction request and comprising a limited use key; and (v) in response to detecting the credential message, initiate the transaction based on the limited use key.

In non-limiting embodiments or aspects, the system further comprises: (b) the second appliance comprising a speaker, an electronic wallet, and at least one processor programmed or configured to: (i) receive the limited use key from at least one remote server; (ii) generate an audible output based at least partially on the limited use key; and (iii) playing, with the speaker of the second appliance, the audible output within audible range of a first appliance such that a microphone of the first appliance receives the audible output. In non-limiting embodiments or aspects, the processor of the first appliance is further programmed or configured to detect a presence of the second appliance. In non-limiting embodiments or aspects, the processor of the first appliance detects the presence of the second appliance based on radio frequency. In non-limiting embodiments or aspects, the first appliance comprises a media system including natural language processing functionality, and the second appliance comprises a mobile phone.

According to non-limiting embodiments or aspects, provided is a computer-implemented method for conducting secure transactions with at least two appliances, comprising: receiving, with a transaction processing system, a transaction request from a first appliance including a processor, a speaker, and a microphone, the transaction request identifying a second appliance and an account identifier; generating, with the transaction processing system, a limited use key corresponding to the account identifier; communicating, with the transaction processing system, the limited use key to the second appliance; receiving, with the transaction processing system, the limited use key from the first appliance; and processing, with the transaction processing system, a transaction based on the transaction request and the limited use key. In non-limiting embodiments or aspects, the first appliance comprises a media system including natural language processing functionality, and the second appliance comprises a mobile phone.

According to non-limiting embodiments or aspects, provided is a computer program product for conducting secure transactions with at least two appliances, comprising at least one non-transitory computer-readable medium including program instructions that, when executed by at least one processor of a transaction processing system, cause the at least one processor to: receive a transaction request from a first appliance including a processor, a speaker, and a microphone, the transaction request identifying a second appliance and an account identifier; generate a limited use key corresponding to the account identifier; communicate the limited use key to the second appliance; receive the limited use key from the first appliance; and process a transaction based on the transaction request and the limited use key. In non-limiting embodiments or aspects, the first appliance comprises a media system including natural language processing functionality, and the second appliance comprises a mobile phone.

According to non-limiting embodiments or aspects, provided is a computer-implemented method for conducting secure transactions with at least two appliances, comprising: receiving, with a second appliance, a limited use key from at least one remote server, the second appliance comprising a speaker and an electronic wallet; generating, with the second appliance, an audible output based at least partially on the limited use key; and playing, with the speaker of the second appliance, the audible output within audible range of a first appliance, such that a microphone of the first appliance receives the audible output.

According to non-limiting embodiments or aspects, provided is a system for conducting secure transactions with at least two appliances, comprising at least one processor programmed or configured to: receive a transaction request from a first appliance including a processor, a speaker, and a microphone, the transaction request identifying a second appliance and an account identifier; generate a limited use key corresponding to the account identifier; communicate the limited use key to the second appliance; receive the limited use key from the first appliance; and process a transaction based on the transaction request and the limited use key. In non-limiting embodiments or aspects, the first appliance comprises a media system including natural language processing functionality, and the second appliance comprises a mobile phone.

According to non-limiting embodiments or aspects, provided is a computer program product for conducting secure transactions with at least two appliances, comprising at least one non-transitory computer-readable medium including program instructions that, when executed by at least one processor of a second appliance, cause the at least one processor to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

In non-limiting embodiments or aspects, the program instructions further cause the at least one processor to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

According to non-limiting embodiments or aspects, provided is a system for conducting secure transactions with at least two appliances, comprising at least one processor programmed or configured to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

In non-limiting embodiments or aspects, the at least one processor is further programmed or configured to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

Other non-limiting embodiments or aspects will be set forth in the following numbered clauses:

Clause 1: A computer-implemented method for conducting secure transactions with at least two appliances, comprising: monitoring audio data with a first appliance including a processor, a speaker, and a microphone; detecting, with the first appliance, an audible request to initiate a transaction from a user from the audio data; communicating, with the first appliance, a transaction request to at least one remote server in response to detecting the audible request to initiate the transaction; detecting, with the first appliance, a credential message received by the first appliance directly from a second appliance via an audio transmission, the credential message corresponding to the transaction request and comprising a limited use key provided to the second appliance from the at least one remote server or another remote server;

and in response to detecting the credential message, initiating, with the first appliance, the transaction based on the limited use key.

Clause 2: The computer-implemented method of clause 1, further comprising detecting a presence of the second appliance with the first appliance.

Clause 3: The computer-implemented method of clause 1 or 2, wherein the first appliance detects the presence of the second appliance based on radio frequency.

Clause 4: The computer-implemented method of any of clauses 1-3, further comprising: receiving, with the second appliance, the limited use key from the at least one remote server; and generating, with the second appliance, the credential message based on the limited use key.

Clause 5: The computer-implemented method of any of clauses 1-4, wherein the credential message is communicated from the second appliance to the first appliance by generating an audible output that is received by the microphone of the first appliance.

Clause 6: The computer-implemented method of any of clauses 1-5, wherein the first appliance comprises a media system including natural language processing functionality, and wherein the second appliance comprises a mobile phone.

Clause 7: A computer program product for conducting secure transactions with at least two appliances, comprising at least one non-transitory computer-readable medium including program instructions that, when executed by at least one processor of a first appliance including a processor, a speaker, and a microphone, cause the at least one processor to: monitor audio data; detect an audible request to initiate a transaction from a user included in the audio data; communicate a transaction request to at least one remote server in response to detecting the audible request to initiate the transaction; detect a credential message received directly from a second appliance via audio transmission, the credential message corresponding to the transaction request and comprising a limited use key; and in response to detecting the credential message, initiate the transaction based on the limited use key.

Clause 8: The computer program product of clause 7, wherein the program instructions further cause the at least one processor to detect a presence of the second appliance with the first appliance.

Clause 9: The computer program product of clause 7 or 8, wherein the first appliance detects the presence of the second appliance based on radio frequency.

Clause 10: The computer program product of any of clauses 7-9, wherein the credential message is communicated from the second appliance to the first appliance by generating an audible output that is received by the microphone of the first appliance.

Clause 11: The computer program product of any of clauses 7-10, wherein the first appliance comprises a media system including natural language processing functionality, and wherein the second appliance comprises a mobile phone.

Clause 12: A system for conducting secure transactions, comprising: (a) a first appliance comprising a speaker, a microphone, a network adapter, and a processor in communication with the speaker, the microphone, and the network adapter, the processor programmed or configured to: (i) monitor audio data with the microphone; (ii) detect an audible request to initiate a transaction from a user included in the audio data; (iii) communicate a transaction request to at least one remote server in response to detecting the audible request; (iv) detect a credential message received directly from a second appliance via audio and/or radio transmission, the credential message corresponding to the transaction request and comprising a limited use key; and (v) in response to detecting the credential message, initiate the transaction based on the limited use key.

Clause 13: The system of clause 12, further comprising: (b) the second appliance comprising a speaker, an electronic wallet, and at least one processor programmed or configured to: (i) receive the limited use key from at least one remote server; (ii) generate an audible output based at least partially on the limited use key; and (iii) playing, with the speaker of the second appliance, the audible output within audible range of a first appliance, such that a microphone of the first appliance receives the audible output.

Clause 14: The system of clause 12 or 13, wherein the processor of the first appliance is further programmed or configured to detect a presence of the second appliance.

Clause 15: The system of any of clauses 12-14, wherein the processor of the first appliance detects the presence of the second appliance based on radio frequency.

Clause 16: The system of any of clauses 12-15, wherein the first appliance comprises a media system including natural language processing functionality, and wherein the second appliance comprises a mobile phone.

Clause 17: A computer-implemented method for conducting secure transactions with at least two appliances, comprising: receiving, with a transaction processing system, a transaction request from a first appliance including a processor, a speaker, and a microphone, the transaction request identifying a second appliance and an account identifier; generating, with the transaction processing system, a limited use key corresponding to the account identifier; communicating, with the transaction processing system, the limited use key to the second appliance; receiving, with the transaction processing system, the limited use key from the first appliance; and processing, with the transaction processing system, a transaction based on the transaction request and the limited use key.

Clause 18: The computer-implemented method of clause 17, wherein the first appliance comprises a media system including natural language processing functionality, and wherein the second appliance comprises a mobile phone.

Clause 19: A computer program product for conducting secure transactions with at least two appliances, comprising at least one non-transitory computer-readable medium including program instructions that, when executed by at least one processor of a transaction processing system, cause the at least one processor to: receive a transaction request from a first appliance including a processor, a speaker, and a microphone, the transaction request identifying a second appliance and an account identifier; generate a limited use key corresponding to the account identifier; communicate the limited use key to the second appliance; receive the limited use key from the first appliance; and process a transaction based on the transaction request and the limited use key.

Clause 20: The computer program product of clause 19, wherein the first appliance comprises a media system including natural language processing functionality, and wherein the second appliance comprises a mobile phone.

Clause 21: A computer-implemented method for conducting secure transactions with at least two appliances, comprising: receiving, with a second appliance, a limited use key from at least one remote server, the second appliance comprising a speaker and an electronic wallet; generating, with the second appliance, an audible output based at least partially on the limited use key; and playing, with the speaker of the second appliance, the audible output within audible range of a first appliance, such that a microphone of the first appliance receives the audible output.

Clause 22: A system for conducting secure transactions with at least two appliances, comprising at least one processor programmed or configured to: receive a transaction request from a first appliance including a processor, a speaker, and a microphone, the transaction request identifying a second appliance and an account identifier; generate a limited use key corresponding to the account identifier; communicate the limited use key to the second appliance; receive the limited use key from the first appliance; and process a transaction based on the transaction request and the limited use key.

Clause 23: The system of clause 22, wherein the first appliance comprises a media system including natural language processing functionality, and wherein the second appliance comprises a mobile phone.

Clause 24: A computer program product for conducting secure transactions with at least two appliances, comprising at least one non-transitory computer-readable medium including program instructions that, when executed by at least one processor of a second appliance, cause the at least one processor to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

Clause 25: The computer program product of clause 24, wherein the program instructions further cause the at least one processor to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

Clause 26: A system for conducting secure transactions with at least two appliances, comprising at least one processor programmed or configured to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

Clause 27: The system of clause 26, wherein the at least one processor is further programmed or configured to: receive a limited use key from at least one remote server, the second appliance comprising a speaker and an electronic wallet; generate an audible output based at least partially on the limited use key; and play, with the speaker of the second appliance, the audible output within audible range of a first appliance, such that a microphone of the first appliance receives the audible output.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
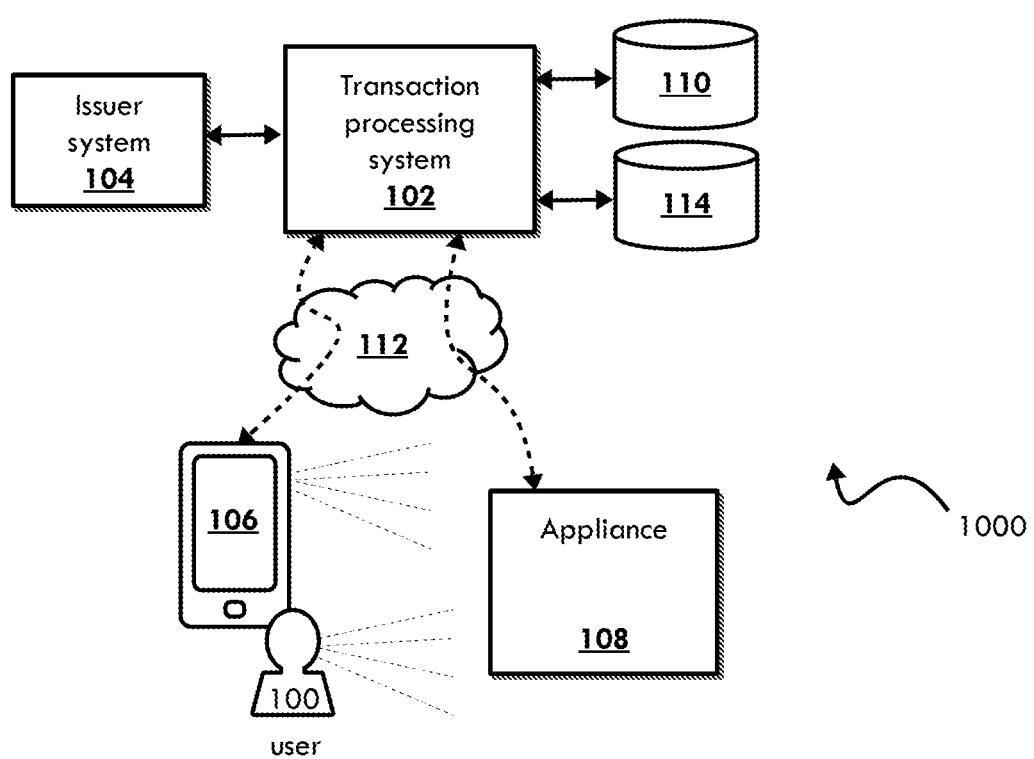
FIG. 1 is a schematic diagram of a system for conducting secure transactions with at least two appliances according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "acquirer institution" may refer to an entity licensed by the transaction service provider and approved by the transaction service provider to originate transactions using a portable financial device of the transaction service provider. The transactions may include original credit transactions (OCTs) and account funding transactions (AFTs). The acquirer institution may be authorized by the transaction service provider to originate transactions using a portable financial device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "appliance," as used herein, refers to any electronic device that is configured to communicate with one or more servers, devices, and/or systems. An appliance may include a mobile device, a network-enabled household appliance (e.g., a network-enabled television, speaker system, refrigerator, thermostat, and/or the like), a computer system, a POS system, and/or any other like device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a PDA, a security card, an access card, a wireless terminal, and/or a transponder, as examples. The payment device may include a volatile or a non-volatile memory to store information, such as an account identifier or a name of the account holder.

Non-limiting embodiments of the present disclosure are directed to a system, method, and apparatus for conducting secure transactions that provide enhanced security and solve technical limitations of existing online payment methods initiated with electronic devices. For example, in non-limiting embodiments, a user may securely authorize a transaction that is initiated and conducted by an appliance, such as a network-enabled speaker system with natural language processing capabilities, without having to regularly provision that appliance with an account identifier, such as a token, or other payment credential. Instead, non-limiting embodiments provide a unique arrangement in which a first appliance initiates a transaction based on a limited use key provided by another appliance, such as a user mobile device, via audio transmission (e.g., sonic transmission). By utilizing an arrangement with two appliances, one having at least a speaker and the other having at least a microphone, a secure transaction can be carried out where the consumer's authentication is limited and his/her account identifier is not exposed. Non-limiting embodiments also provide for efficiencies for home assistant platforms, payment gateways, and/or merchant systems that can accept transaction requests from users without having to separately receive, process, and store account information.

Referring now to FIG. 1, a system 1000 for conducting secure transactions with two appliances is shown according to a non-limiting embodiment. A user 100 possesses a first appliance 106 which, in the example shown in FIG. 1, is a mobile phone. The user 100 and first appliance 106 are in proximity to a second appliance 108. The second appliance 108 may include, for example, a network-enabled media system such as a Google Home® speaker, an Amazon Echo® speaker, a smart television, another mobile device, and/or the like. In non-limiting embodiments, the second appliance 108 may be a network-connected media system, such as a speaker and/or display, executing a virtual assistant platform with natural language processing capabilities.

Still referring to FIG. 1, the proximity between the first appliance 106 and the second appliance 108 may be within audible range such that the microphone of the second appliance 108 can receive sound waves from the user 100 (e.g., such as the user speaking) and the speaker of the first appliance 106. For example, the proximity between the first appliance 106 and second appliance 108 may be within 0 to 30 feet, depending on the volume, obstacles in the path of the sound waves, and/or other environmental conditions. In non-limiting embodiments, the proximity between the first appliance 106 and the second appliance 108 may be within range of wireless communication between the appliances 106, 108 through, for example, radio frequency communication. It will be appreciated that various other arrangements are possible.

With continued reference to FIG. 1, the first appliance 106 and second appliance 108 are in communication with a transaction processing system 102 through one or more network environments 112. In some non-limiting embodiments, the appliances 106, 108 may communicate with the transaction processing system 102 through one or more intermediary systems. For example, the second appliance 108 may communicate with the transaction processing system 102 indirectly through an acquirer system or payment gateway (not shown in FIG. 1). The first appliance 106, in some examples, may be in communication with an issuer system 104, such as through an electronic wallet application. The transaction processing system 102 is also in communication with one or more databases 110, 114. In some non-limiting embodiments, the first appliance 106 may be in communication with the second appliance 108 through, for example, a Bluetooth® connection, a WiFi® connection, and/or through any other communication protocols.

Still referring to FIG. 1, the user 100 may wish to conduct a transaction using the second appliance 108. For example, in an example where the second appliance 108 is a network-enabled speaker system, the user 100 may request to purchase an item (e.g., "order a pizza" or "order more toothpaste"), an album or song being played on streaming audio (e.g., "buy this song"), a subscription (e.g., "renew my subscription"), or any other good or service. In other examples, where the second appliance 108 is a network-enabled television or display device, the user 100 may request to purchase or rent a movie, purchase a product from a merchant application or website, and/or the like. Once the user 100 conveys his/her request to the second appliance 108 to conduct a transaction, the second appliance 108, using natural language processing techniques, parses the user's speech and determines one or more goods or services associated with one or more merchants. In some examples, a merchant application may be running on the second appliance 108 that is in communication with a database of product information and can be used to identify a requested product. In other examples, an application on the second appliance 108 may search merchant websites and/or merchant applications based on the user's request. It will be appreciated that, in some non-limiting embodiments, the user may request a transaction through a graphical user interface (GUI) or in some other manner rather than audibly requesting the transaction.

In some non-limiting embodiments, and still referring to FIG. 1, the second appliance 108 may prompt the user 100 to verbally confirm the product or service being purchased. In some non-limiting embodiments, the second appliance 108 may prompt the user to specify a payment method to use. For example, in response to requesting a transaction, the second appliance 108 may audibly prompt the user and, in response to the prompt, the user may say "Visa" or "use my Visa card." The user's response may also identify an issuer institution associated with a payment device that the user wishes to use. Accordingly, the second appliance 108 may identify a transaction processing system 102 associated with a payment network of a plurality of possible payment networks, an issuer system of a plurality of possible issuer systems, and/or the like.

With continued reference to FIG. 1, once the second appliance 108 determines the product being purchased, the second appliance 108 generates and communicates a transaction request message to the transaction processing system 102. The transaction request message may include, for example, a user identifier that uniquely identifies the user 100, transaction data (e.g., transaction amount, product identifier, merchant identifier, time, date, and/or the like), or any other data related to the requested transaction or the user 100. The transaction processing system 102 may then receive the transaction request message, parse the message, and identify the information contained therein. The transaction processing system 102 may then, based on the database 110, identify the user 100, an account identifier (e.g., a PAN) associated with an account issued to the user 100, and a device identifier (e.g., IP address, MAC address, unique string, user name, and/or the like) and/or electronic wallet identifier associated with the first appliance 106.

Still referring to FIG. 1, once the transaction processing system 102 identifies the user 100 and the account identifier associated with the user 100, the transaction processing system 102 generates or obtains a limited use key ("LUK"). The LUK may be, for example, a token such as an alphanumeric string that corresponds to the user's PAN such that the PAN or other account identifier is not exposed. The LUK may also be a Card Verification Value (CVV), such as but not limited to CVV2, dynamic CVV, and/or the like. The LUK may also be an audible token that includes alphanumeric data encoded into audio data. The LUK may have an expiration period, such as one to several minutes. The LUK may also be associated with other limitations on its usage, such as requiring a specific device identifier, merchant identifier, transaction value, and/or the like.

In some non-limiting examples, the LUK may be tied to an electronic wallet application on the first appliance 106. It will be appreciated that other variations are possible. In some non-limiting embodiments, the LUK may be generated by the issuer system 104 based on account data provided by the transaction processing system 102 or already stored by the issuer system 104. For example, the issuer system 104 may identify the user based on an account identifier that is already in a database of the issuer system 104. In some non-limiting examples, the issuer system 104 may include or be in communication with an audible token database that stores audible tokens for a plurality of different accounts.

With continued reference to FIG. 1, the transaction processing system 102 communicates the LUK to the first appliance 106. It will be appreciated that, in some non-limiting embodiments, the LUK may be communicated by the issuer system 104 or a payment gateway. The first appliance 106, based on the LUK, generates one or more credential messages including at least a portion of the LUK and communicates the credential message. For example, the first appliance 106 may generate an audio file that encodes numerical values representing the LUK as one or more frequencies and then play that audio file using a speaker of the first appliance 106. The sound waves may or may not be perceivable by the human ear. The microphone of the second appliance 108 detects the sound waves either based on a prompt that commands the second appliance 108 to listen for the sound waves or based on continually monitoring audio data received through the microphone. The second appliance 108 then processes the sound waves to determine the LUK. For example, the second appliance 108 may decode the frequency of the sound waves based on an algorithm to reproduce the LUK.

Still referring to FIG. 1, once the second appliance 108 determines the LUK from the sound waves received from the first appliance 106, the second appliance 108 initiates the transaction requested by the user. For example, the second appliance 108 may generate an authentication request message based on the transaction data and the LUK and communicate the authentication request message to the transaction processing system 102 directly or through an acquirer system or payment gateway (not shown in FIG. 1). In some examples, the transaction processing system 102 or an acquirer system or payment gateway may generate an authentication request message based on the previously-communicated transaction request message from the second appliance 108. The transaction processing system 102, after receiving the LUK, authenticates the transaction based on the LUK by communicating with the issuer system 104. The transaction processing system 102 and/or issuer system 104 may also validate the LUK by determining if the LUK has expired, was communicated from an authorized device or user, has never been used before, and/or the like. It will be appreciated that the transaction may be conducted in various ways using the LUK as an account identifier.

Figure 2:
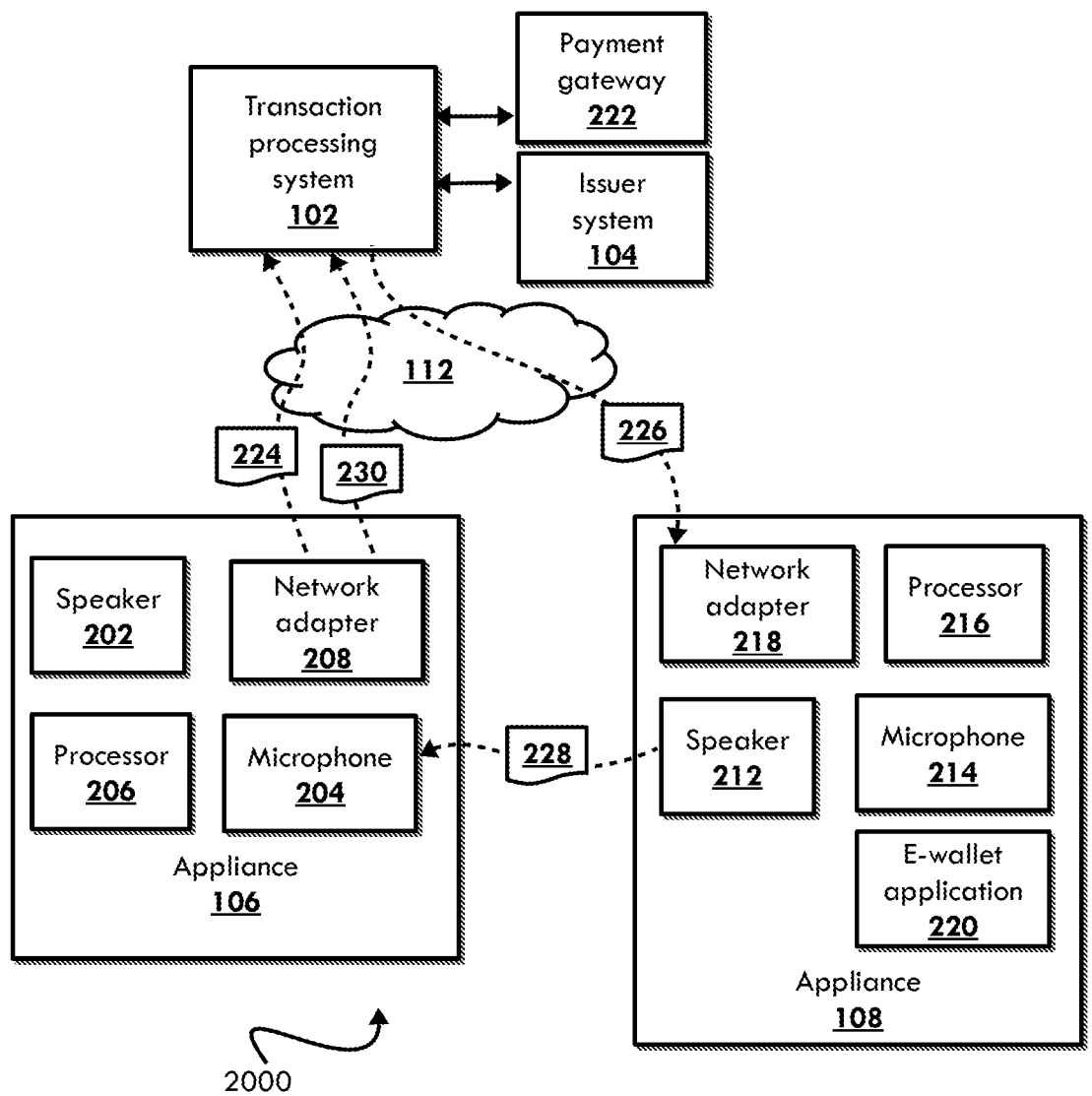
FIG. 2 is another schematic diagram of a system for conducting secure transactions with at least two appliances according to a non-limiting embodiment.

Referring now to FIG. 2, a system 2000 for conducting secure transactions with two appliances is shown according to a non-limiting embodiment. A transaction processing system 102 is in communication with an issuer system 104 and a payment gateway 222. The transaction processing system 102 is also in communication with a first appliance 106 via a network adapter 208 of the first appliance. The issuer system 104 is in communication with a second appliance 108 via a network adapter 218 of the second appliance 208. The first appliance 106, which may include a network-capable speaker or other type of media system, for example, may include a speaker 202, a microphone 204, a processor 206, and a network adapter 208 for communicating with one or more networks. The second appliance 108 may be a computing device, such as a mobile device or another media system, and may also include a speaker 212, microphone 214, processor 216, and network adapter 218. The second appliance may also include memory having stored thereon one or more software applications, such as an electronic wallet application 220 for making payments.

With continued reference to FIG. 2, the speaker 202 of the first appliance 106 receives sound waves from its environment, such as speech from a user. The processor 206 analyzes the sound waves as explained herein to determine an audible request from the user to conduct a transaction. In response to the audible request, the processor 206 generates a transaction request 224 and communicates it, using the network adapter 208, to the transaction processing system 102. The transaction request 224 may include one or more packets of data. In some examples, the transaction request 224 may first be communicated to the payment gateway 222. The transaction processing system 102, in response to the transaction request 224, may generate and/or obtain an LUK 226 based on an account associated with a user of the first appliance 106 and communicate the LUK 226 to the second appliance 108. For example, in some non-limiting embodiments, the transaction processing system 102 may communicate with the issuer system 104 to cause the issuer system 104 to generate an LUK 226 for the transaction and the user's account. The issuer system 104 may then communicate the LUK 226 to the transaction processing system 102. In some non-limiting examples, the issuer system 104 may communicate the LUK 226 to the second appliance 106. It will be appreciated that the LUK 226 may also be communicated by the payment gateway 222 in some non-limiting embodiments.

Still referring to FIG. 2, once the second appliance 108 receives the LUK 226, the processor 216 generates a credential message 228 based on the LUK 226 and communicates the credential message to the first appliance 106 from the speaker 212 such that the credential message 228 can be received by the microphone 204 of the first appliance 106. The credential message 228 includes the LUK 226 and, in some non-limiting embodiments, is encoded to audio for transmission to the first appliance 106. The first appliance 106 then initiates a transaction based on the LUK 226. For example, the first appliance 106 may generate a cryptogram based on the LUK and communicate the cryptogram to the transaction processing system 102 and/or payment gateway 222. The cryptogram may be included in a transaction request message 230 that is generated by the first appliance 106 and communicated to the transaction processing system 102 and/or payment gateway 222.

Figure 3:
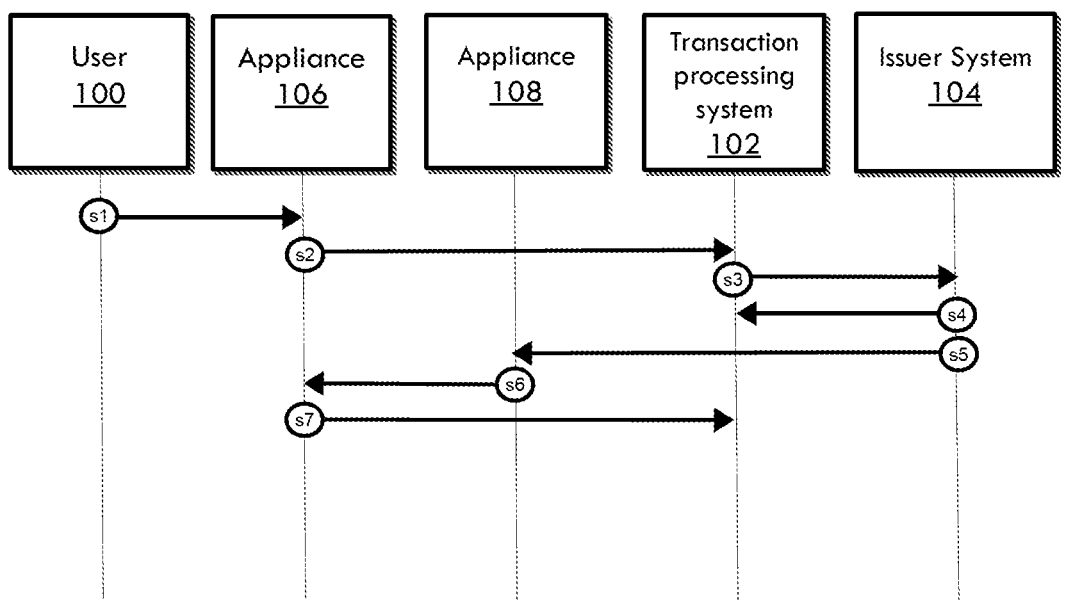
FIG. 3 is a sequence diagram of a method for conducting secure transactions with at least two appliances according to a non-limiting embodiment.

Referring now to FIG. 3, a sequence diagram is shown according to non-limiting embodiments. At a first step s1, the user 100 requests to conduct a transaction with a first appliance 106. The user may do so by audibly speaking the request, communicating the request through a computing device in communication with the appliance 106, and/or the like. At step s2, the first appliance 106 communicates the transaction request, or a separate transaction request based on the transaction request, to the transaction processing system 102. At step s3, the transaction processing system 102 requests a LUK from the issuer system 104 corresponding to the user's account. At step s4, the issuer system 104 communicates an LUK to the transaction processing system. At step s5, the issuer system 104 also communicates the LUK to the second appliance 108. It will be appreciated that the LUK may be provided to the second appliance 108 in various ways from the transaction processing system 102, issuer system 104, and/or payment gateway.

With continued reference to FIG. 3, at step s6 the second appliance 108 communicates a credential message to the first appliance 106 via sound waves. The credential message may be or include the LUK. Once the first appliance 106 receives the sound waves from the second appliance 108, the first appliance 106 may decode the transmission to determine the LUK. The first appliance 106 may then generate a transaction request message including the LUK. For example, the first appliance 106 may generate a cryptogram based on the LUK that is included in the transaction request message. In other examples, the LUK itself may be included in the transaction request message. At step s7, the first appliance 106 communicates the transaction request message, including the LUK and/or a cryptogram generated based on the LUK, to the transaction processing system 102. It will be appreciated that the transaction request message may also be first communicated to a payment gateway which, in turn, communicates a request to the transaction processing system 102.

In non-limiting embodiments, the system and method for conducting secure transactions with two appliances may be used in a residential or business environment in which both appliances belong to a user but where the user only has one appliance provisioned with a credential. In non-limiting embodiments, the system and method for conducting secure transactions with two appliances may be used in a setting such as a hotel room in which one of the appliances (e.g., a network-connected television, a home assistant, and/or the like) does not belong to a user and is therefore not trusted. In such scenarios, a user may wish to purchase or rent a movie, order a product or service, and/or the like, and can utilize his or her mobile phone, computing device, or some other appliance, in conjunction with the non-trusted appliance, to conduct the transaction as described herein.

Figure 4:
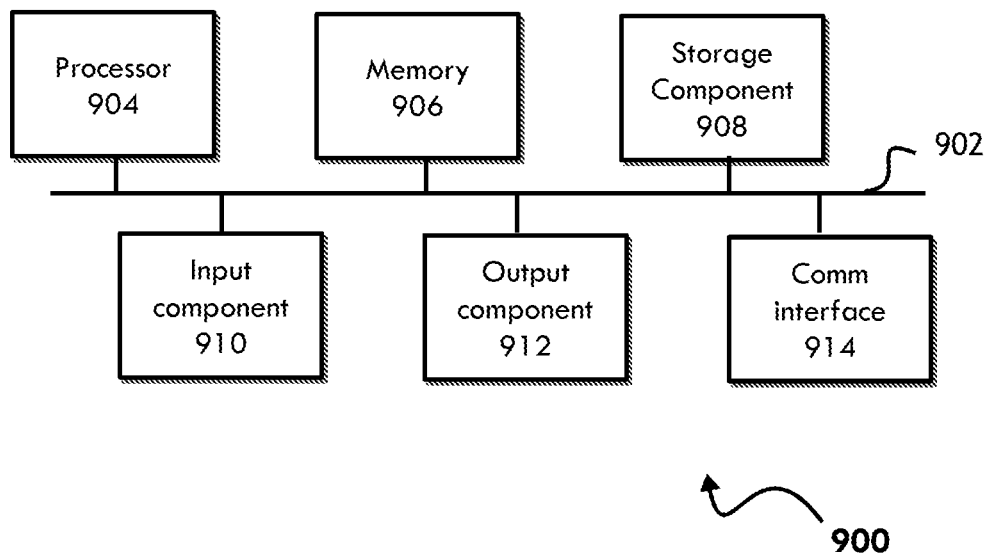
FIG. 4 is a schematic diagram of example components of a device or system according to non-limiting embodiments.

Referring now to FIG. 4, shown is a diagram of example components of a device 900 according to non-limiting embodiments. Device 900 may correspond to one or more devices of the transaction processing system 102, the issuer system 104, the first appliance 106, second appliance 108, and/or payment gateway, as examples. In some non-limiting embodiments, a transaction processing system 102 and/or issuer system 104 may include at least one device 900 and/or at least one component of device 900. The number and arrangement of components are provided as an example. In some non-limiting embodiments, device 900 may include additional components, fewer components, different components, or differently arranged components than those shown in FIG. 4. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read-only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for conducting secure transactions with at least two appliances, comprising:
   monitoring audio data with a first appliance including a processor, a speaker, and a microphone;
   detecting, with the first appliance, an audible request to initiate a transaction from a user from the audio data;
   communicating, with the first appliance, a transaction request to at least one remote server in response to detecting the audible request to initiate the transaction;
   receiving, with a second appliance including a processor and a speaker, a limited use key from the at least one remote server;
   generating, with the second appliance, a credential message based on encoding the limited use key;
   detecting a presence of the second appliance with the first appliance based on radio frequency;
   communicating, with the speaker of the second appliance, the credential message as an audio transmission;
   detecting, with the first appliance, the credential message directly from the second appliance via the audio transmission; and
   in response to detecting the credential message, initiating, with the first appliance, the transaction based on the limited use key.

2. The computer-implemented method of claim 1, wherein the credential message is communicated from the second appliance to the first appliance by generating an audible output that is received by the microphone of the first appliance.

3. The computer-implemented method of claim 1, wherein the first appliance comprises a media system including natural language processing functionality, and wherein the second appliance comprises a mobile phone.

4. A computer program product for conducting secure transactions with at least two appliances, comprising:
   at least one first non-transitory computer-readable medium including program instructions that, when executed by a first appliance including a processor and a microphone, causes the first appliance to:
   monitor audio data;
   detect an audible request to initiate a transaction from a user included in the audio data;
   communicate a transaction request to at least one remote server in response to detecting the audible request to initiate the transaction;
   detect a credential message received directly from a second appliance via audio transmission, the credential message corresponding to the transaction request and comprising a limited use key; and
   in response to detecting the credential message, initiate the transaction based on the limited use key; and
   at least one second non-transitory computer-readable medium including program instructions that, when executed by the second appliance including a processor and a speaker, causes the second appliance to:
   receive the limited use key from the at least one remote server;
   generate the credential message based on encoding numerical values representing the limited use key to frequencies; and
   communicate, with the speaker of the second appliance, the credential message as the audio transmission.

5. The computer program product of claim 4, wherein the program instructions further cause the first appliance to detect a presence of the second appliance.

6. The computer program product of claim 5, wherein the first appliance detects the presence of the second appliance based on radio frequency.

7. The computer program product of claim 4, wherein the credential message is communicated from the second appliance to the first appliance by generating an audible output that is received by the microphone of the first appliance.

8. The computer program product of claim 4, wherein the first appliance comprises a media system including natural language processing functionality, and wherein the second appliance comprises a mobile phone.

9. A system for conducting secure transactions, comprising:
   (a) a first appliance comprising a microphone, a network adapter, and a processor in communication with the microphone and the network adapter; and
   (b) a second appliance comprising a speaker and a processor in communication with the speaker,
   wherein the processor of the first appliance is programmed or configured to:
   monitor audio data with the microphone;
   detect an audible request to initiate a transaction from a user included in the audio data;
   communicate a transaction request to at least one remote server in response to detecting the audible request;
   listen for an audio transmission based on a prompt;
   detect a credential message received directly from the speaker of the second appliance via the audio transmission, the credential message corresponding to the transaction request and comprising a limited use key; and
   in response to detecting the credential message, initiate the transaction based on the limited use key, and
   wherein the processor of the second appliance is programmed or configured to:
   receive the limited use key from the at least one remote server;
   generate the credential message based on encoding the limited use key; and
   communicate, with the speaker of the second appliance, the credential message as the audio transmission.

10. The system of claim 9, wherein generating the credential message comprises generating an audible output based at least partially on the limited use key, and wherein communicating the credential message comprises playing, with the speaker of the second appliance, the audible output within audible range of the first appliance, such that the microphone of the first appliance receives the audible output.

11. The system of claim 9, wherein the processor of the first appliance is further programmed or configured to detect a presence of the second appliance.

12. The system of claim 11, wherein the processor of the first appliance detects the presence of the second appliance based on radio frequency.

13. The system of claim 9, wherein the first appliance comprises a media system including natural language processing functionality, and wherein the second appliance comprises a mobile phone.

14. The computer-implemented method of claim 1, wherein generating the credential message comprises encoding numerical values representing the limited use key to frequencies.

15. The computer-implemented method of claim 14, further comprising determining, with the processor of the first appliance, the limited use key from the audio transmission by decoding the frequencies from the audio transmission.

16. The system of claim 9, wherein the processor of the second appliance generates the credential message by encoding numerical values representing the limited use key to frequencies.

17. The system of claim 16, wherein the processor of the first appliance is further configured to decode the frequencies to determine the limited use key from the audio transmission.

* * * * *